United States Patent
Theisen et al.

[11] Patent Number: 5,975,131
[45] Date of Patent: Nov. 2, 1999

[54] TANK VALVE AND OPENING SENSOR

[76] Inventors: Terry J. Theisen; Joe D. Dumoit, both of 9869 Drysdale, Houston, Tex. 77041

[21] Appl. No.: 08/949,225

[22] Filed: Oct. 10, 1997

[51] Int. Cl.⁶ .................................................... F16K 37/00
[52] U.S. Cl. ........................... 137/554; 137/424; 137/430; 116/277; 73/314; 73/322
[58] Field of Search ............................ 116/277; 137/431, 137/423, 554, 512, 424, 489

[56] References Cited

U.S. PATENT DOCUMENTS

| | | | |
|---|---|---|---|
| 3,859,619 | 1/1975 | Ishihara | 137/554 |
| 4,587,486 | 5/1986 | Soyck | 324/236 |
| 4,618,823 | 10/1986 | Dahlheimer et al. | 324/207 |
| 4,757,213 | 7/1988 | Tigges et al. | 307/116 |
| 4,879,531 | 11/1989 | Tigges et al. | 331/65 |
| 5,012,206 | 4/1991 | Tigges | 331/65 |
| 5,050,639 | 9/1991 | Sorensen | 137/583 |
| 5,140,263 | 8/1992 | Leon | 116/277 |
| 5,144,977 | 9/1992 | Eggerton et al. | 137/554 |
| 5,236,010 | 8/1993 | George, II et al. | 137/554 |
| 5,264,733 | 11/1993 | Tigges | 307/116 |
| 5,311,903 | 5/1994 | Poulin | 137/554 |
| 5,497,725 | 3/1996 | Theisen et al. | 116/277 |
| 5,511,581 | 4/1996 | Ligh | 137/489 |

OTHER PUBLICATIONS

Turk, Inc. Brochure, pp. C25 and C26.

*Primary Examiner*—A. Michael Chambers
*Assistant Examiner*—Thomas L. McShane
*Attorney, Agent, or Firm*—Kenneth H. Johnson

[57] ABSTRACT

A device for providing remote indication of the opening of a weighted pallet type tank vent in which a permanent magnet is attached to the end of the pallet guide shaft distal to the pallet. A magnetic induction sensor is secured to the outside of the shaft guide to sense movement of the magnetic field produced by the magnet and produce an electrical signal which may be transmitted to a remote location to indicate that the pallet has opened and relieved pressure in the tank.

10 Claims, 4 Drawing Sheets

TANK VALVE AND OPENING SENSOR

BACKGROUND OF THE INVENTION

1. Field of the Invention

The present invention relates to tank venting valves for relieving the internal pressure in tanks at a predetermined pressure. More specifically the invention is concerned with whether a venting valve has opened and actuated.

2. Related Art

There are several types of pressure relief valves for atmospheric or low pressure storage tanks. One of the basic designs is known as a "weight loaded tank vent". The design utilizes a weighted cover over a nozzle for the seating area. The cover, also known as a pallet, forms a barrier to the nozzle opening. The weight of the pallet determines at what pressure the pallet will lift open to relieve pressure in the tank. The start to open pressure indicated by lift of the cover is known as the "set pressure". The set pressure can easily be determined by dividing the weight of the pallet assembly by the open area of the nozzle. If a higher set pressure is desired more weight is added to the pallet.

Other types of pressure relieving devices include a spring loaded tank vent and a pilot operated tank vent. The spring loaded type is used for set pressures above that which is practical for weight loaded operation due to either a high set pressure where there is not enough room for the weights on the pallet, or where the size of the vent nozzle dictates too large of an overall weight on the pallet.

Pilot operated tank vents utilize the tank pressure acting on an area larger than the nozzle area to create a higher downward force to hold down a pallet or seat plate against the tank pressure. The set pressure is adjustable by means of a spring in the pilot.

Any of the three types may be vented to the atmosphere or piped into headers for vapor recovery or burning. Generally these valves open, make an emission or release and close without producing any record of opening and can present a source of atmospheric contamination. Often it is desirable to have a record of when a particular vent valve has opened.

U.S. Pat. No. 5,497,725 discloses a sight indicator which mechanically indicates whether a tank vent valve has opened and also to what approximate degree. The sight indicator has the drawback that a person must actually see the indicator which may require a person to climb on the tank. In addition, the sight indicator will not indicate how many times the vent has opened.

Proximity switches are devices which react to motion without being in actual contact with the moving part. common proximity switches utilize a generated magnetic field that is disturbed when a metallic object moves into the field. These proximity switches are not very sensitive and require substantial movement before detection. Such proximity switches are variously described in U.S. Pat. Nos. 4,618,823; 4,757,213; 4,879,531; 5,012,206 and 5,264,733.

Such a magnetic induction proximity is described generally in U.S. Pat. No. 4,587,486 discloses a magnetic-field-dependent proximity switch which detects the movement of a magnetic field provided by a permanent magnet attached to the moving part. Werner Turck GmbH & Co. manufactures a magnetic induction proximity switch which operates by sensing the movement of a magnetic field which it designates as cylinder position indicators for use on hydraulic cylinders to determine the movement of the cylinder. It is advisable that these devices be potted (hermetically sealed) and have FM or UL type approvals for safety and commercial uses.

It is an advantage that the present device will not interfere with the breather vents function or relief capacities. It is a feature that the present device provides a signal that may be transmitted to a remote location and recorded after the vent valve is closed. It is another feature that the present device can be retrofitted easily to existing vent valves. Additionally, it is a feature that the sensitivity of the device detects movement of less that $\frac{1}{32}$ inch so that minor openings of the tank valve can be detected. These and other features and advantages will become apparent from the following descriptions.

SUMMARY OF THE INVENTION

Briefly the present invention is a device for providing a signal that can be sent to a remote location indicating the actuation of a tank vent opening comprising a magnet affixed to a proximal end of the shaft on the pallet and an induction proximity switch mounted externally on the shaft guide to sense movement of the magnet on said guide.

In one embodiment the invention is a device comprising:

a shaft associated with a tank vent pallet at a distal end, a magnet affixed to a proximal end of said shaft, a non-magnetic shaft guide to allow linear movement of said shaft and said magnet therein in response to movement of said pallet, a magnetic-field-dependent proximity switch, preferably capable of detecting movement of the magnet of less than $\frac{1}{32}$ inch, associated with said shaft guide and within a magnetically actuatable distance of said magnet and electrical conduit connected to said proximity switch for carrying an electrical signal to a remote location, for example, non hazardous location for safety.

PREFERRED EMBODIMENTS

Figure 1:
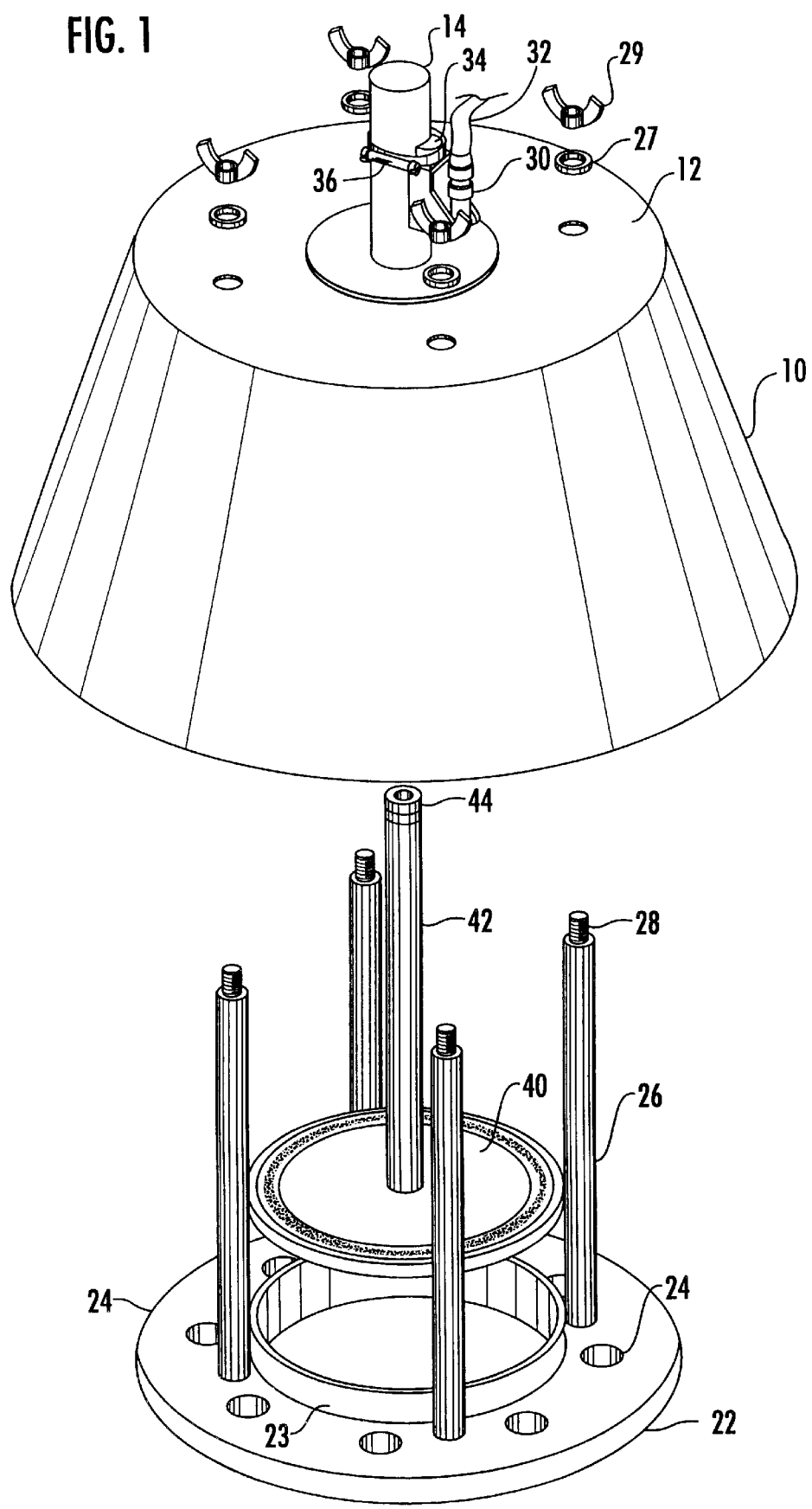
FIG. 1 is an exploded isometric view of a tank vent valve with the vent valve sensor.
Figure 2:
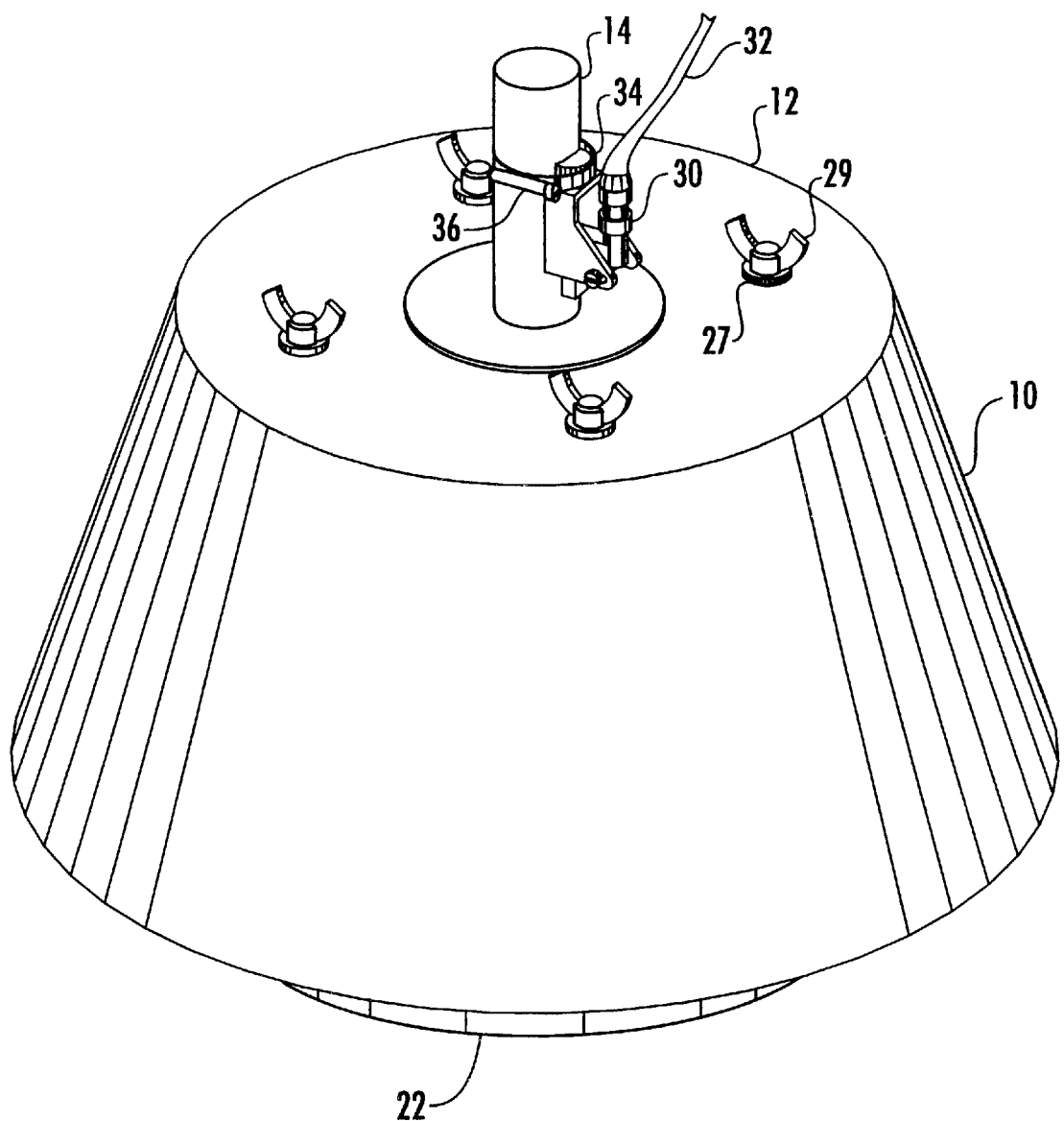
FIG. 2 is an isometric view of the assembled tank vent valve showing the location of the sensor.

Referring first to FIGS. 1 and 2 a typical relief valve is shown to comprise a weighted pallet 40 seated on a nozzle 23 in a mounting flange 22, having mounting holes 24 around its circumference which acts as a seat and is a part of the nozzle flange 22. The shaft 42 extends upward from the pallet 40. A permanent magnet (or magnets) 44 is secured to the top of the shaft 42. A cover 10 having a flat top surface 12 is affixed to the flange 22 by four studs 26 having threads 28 at the upper end thereof. The cover 10 is held in place by four washers 27 and wing nuts 29. A shaft guide 14 to receive the shaft 42 is secured to the top surface 12 of the cover 10. One or more magnetic induction sensor 30 is secured to the shaft guide 14 by ring clamp 34 which is tightened by screw 36. An electrical cable 32 is attached to the sensor 30 and carries the signal to the desired remote location. The shaft guide 14 is made of a non magnetic material: such as non-ferrous metals, e.g. aluminum, manganese; polymeric materials, e.g. plastics, fiberglass, glass, ABS and carbon composites.

Figure 3:
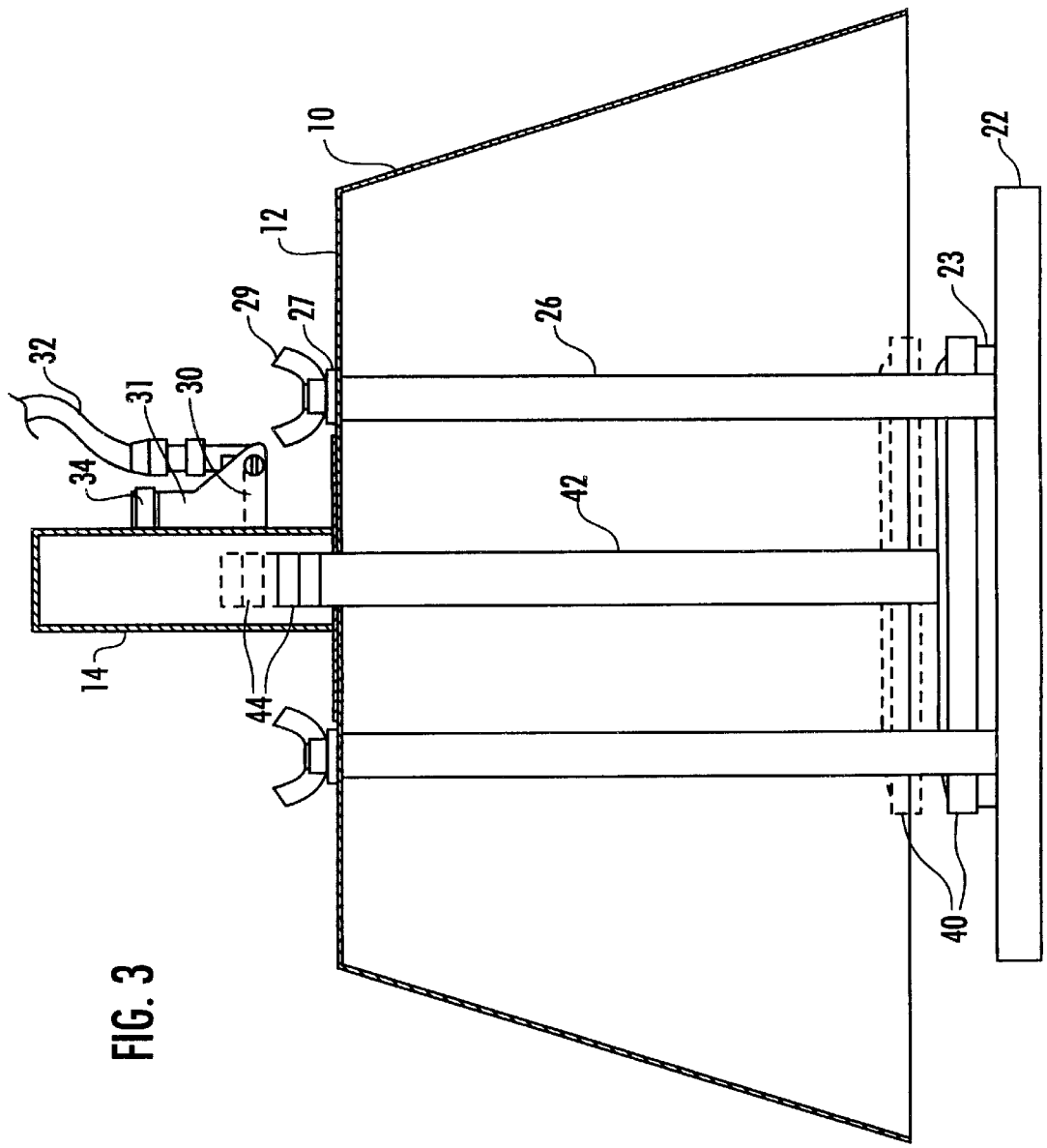
FIG. 3 is a cross sectional side elevational view of a tank vent valve with the sensor mounted thereon.

Referring now to FIG. 3 a side elevational view in cross section of a typical vent valve is shown. The cover 10 and shaft guide 14 are seen secured to the mounting flange 22 by studs 26, washers 27 and wing nuts 29 with the shaft 42 extending marginally up into the shaft guide 14. When the vent valve is actuated the pallet rises (shown in dotted lines in FIGS. 3 and 4) and moves the permanent magnets 44 upward. The magnetic induction sensor 30 senses the movement of the magnetic field and transmits a signal via the cable 32 to the desired remote location. The signal may be received through a switching amplifier by an annunciator panel in a control room which lights up and produces a audible signal until acknowledged. At this point the signal can be reset.

The sensor device 30 shown by dotted line in mounting bracket 31 is preferably a TURCK cylinder position indicator part number BIM-IKE-Y1X-H1141 sold in the United States by Turck Inc. of Minneapolis Minn. It is installed by use of a clamp ring 34. The clamp ring is secured about the sensor and the shaft guide and tightened into place. The sensitivity is adjusted by moving the sensor along the axis of the shaft guide 14.

Figure 4:
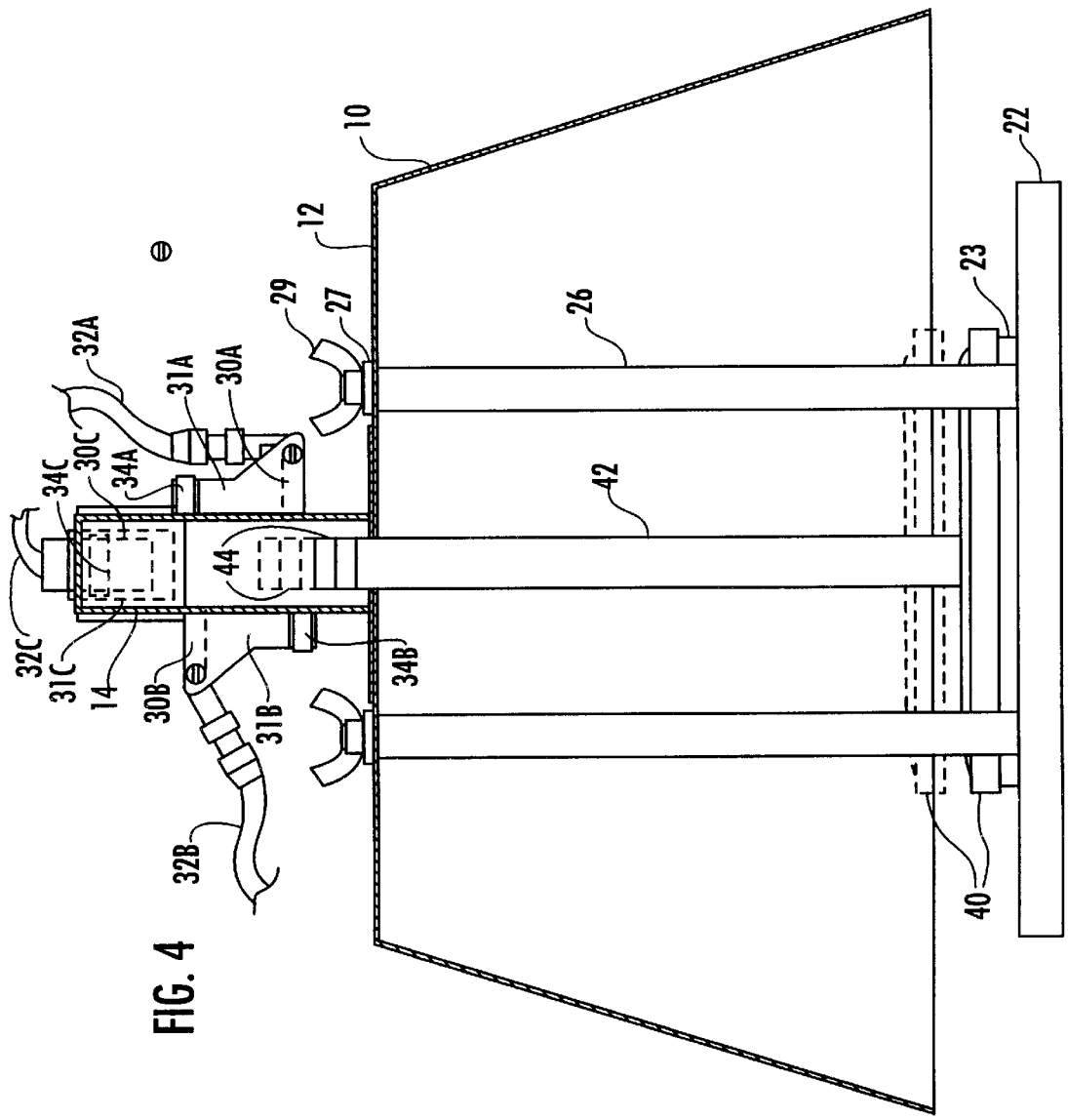
FIG. 4 is a side elevation of the vent valve of FIG. 3 with two additional sensors.

The sensitivity may be adjusted by raising pallet 40 a predetermined distance and placing the sensor at the point on the shaft guide where the electrical signal indicating activation of the sensor, is first detected. The sensor may set at a location to detect very slight lifting of the pallet or at a point more distant to the pallet to detect more significant opening. Because of the sensitivity of the magnetic-field-dependent proximity sensors more than one sensor may be placed along the shaft guide, as shown by FIG. 4 where three sensors 30a–c (and corresponding conduits 32a–c and brackets 31a–c) are shown position along the guide shaft at different elevations. Sensor 30a could indicate a minimal opening, with sensors 30b and 30c indication openings of greater magnitude. It should also be appreciated that the signal from the sensor is maintained as long is there is a magnetic field detected by the sensor. Thus, the duration and severity of the opening is also quantitatively discernable by the display at a remote location.

The specifications of the TURCK sensor are follows:

| | |
|---|---|
| Nominal Voltage | 8.2 VDC. |
| Resistance Change from Non-Activated to Activated | >8.0 kΩ to 1.0 kΩ |
| Resulting Current Change | <1.0 mA to >2.2 mA |
| Recommend switching point for Remote Amplifier | 1.55 mA |
| Maximum Approach Velocity | <10 in/s |
| Repeatability | <0.1 mm |
| Magnetic Actuation Strength | 20 –350 gauss |

As may be seen from the above specifications the permanent magnet 44 attached to the shaft 42 should have a minimum strength of at least 20 gauss.

The invention claimed is:

1. A device comprising:
    a shaft associated with a tank vent pallet at a distal end,
    a magnet affixed to a proximal end of said shaft,
    a non-magnetic shaft guide to allow linear movement of said shaft and said magnet therein in response to movement of said pallet said shaft guide having a top and a side,
    at least one magnetic-field-dependent proximity switch affixed externally to the side of said shaft guide in axial relation to said shaft and within a magnetically actuatable distance of said magnet and
    electrical conduit connected to said proximity switch for carrying an electrical signal to a remote location.

2. The device according to claim 1 wherein at least two magnetic-field-dependent proximity switches are positioned longitudinally along said shaft guide.

3. A tank vent valve actuation sensor comprising a permanent magnet having a magnetic field mounted on a shaft of the tank vent valve and at least one magnetic induction sensor externally mounted in axial relation to said shaft on the side of a non metallic shaft guide of the tank vent valve such that movement of the shaft produces movement of said permanent magnet and the magnetic field, said movement of said magnetic field being sensed by said sensor and generating a signal that can be transmitted to a position remote to said tank vent valve.

4. A combination tank vent valve and vent valve actuation sensor comprising:
    (a) a body having a mounting flange, a nozzle and seat;
    (b) a pallet seatable on said seat;
    (c) a shaft extending upward from said pallet;
    (d) a cover affixed to said body to cover said pallet and nozzle;
    (e) a shaft guide affixed to said cover directly above said shaft;
    (f) a permanent magnet mounted on the upper end of said shaft; and
    (g) at least one magnetic induction sensor mounted axially on the outside of said guide to sense movement of said magnet and produce a signal indicating said movement.

5. The combination tank vent valve and vent valve actuation sensor of claim 4 further comprising a transmission cable attached to said sensor to transmit said signal to a remote location.

6. The combination tank vent valve and vent valve actuation sensor of claim 4 wherein said shaft guide is constructed of non magnetic material.

7. The combination tank vent valve and vent valve actuation sensor according to claim 4 wherein said sensor is activated by a magnetic strength of between 20 and 350 gauss.

8. The combination tank vent valve and vent valve actuation sensor according to claim 4 wherein the sensitivity of said sensor is adjusted by raising or lowering the sensor on said shaft guide.

9. The combination vent valve and vent valve actuation sensor according to claim 4 wherein the sensor is capable of detecting movement of said magnet of less than 1/31 inch.

10. The combination tank vent valve and vent valve actuation sensor of claim 4 further comprising a plurality of said magnetic induction sensors mounted and spaced apart longitudinally along the outside of said guide.

* * * * *